Patented Apr. 6, 1954

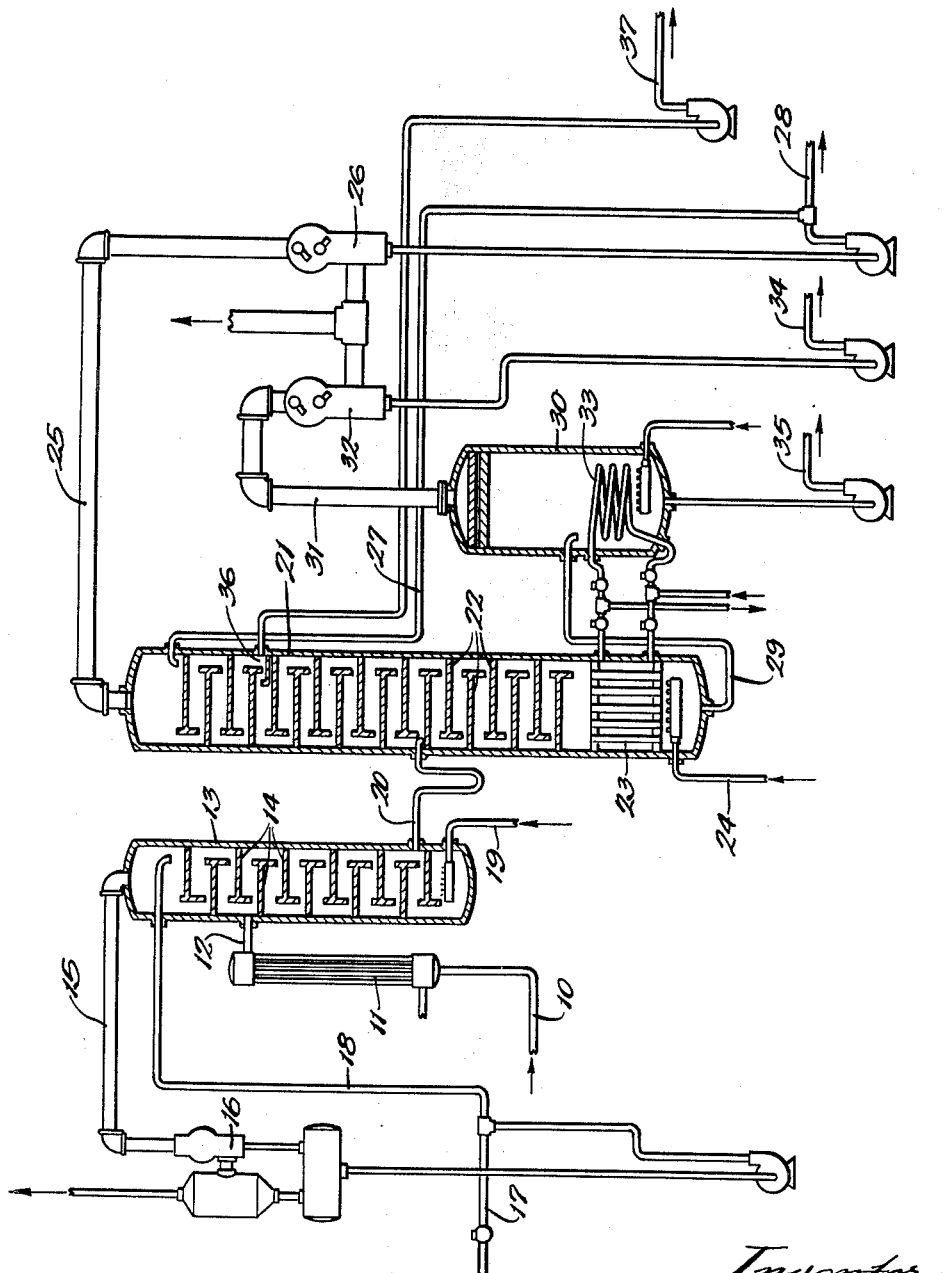

2,674,570

UNITED STATES PATENT OFFICE 2,674,570

PROCESS FOR DISTILLING TALL OIL

Ralph H. Potts, La Grange, Ill., assignor to Armour and Company, Chicago, Ill., a corporation of Illinois Application October 27, 1950, Serial No. 192,469

4 Claims. (Cl. 202—52)

1

This invention relates to a process for treating tall oil to prepare valuable products therefrom.

Tall oil is a dark colored liquid by-product of the paper industry. It is obtained from the "black liquor" residue of pulp wood in the manufacture of paper. It is available commercially in enormous quantities, but due to its generally objectionable character its use in industry has been very limited and when used it has often been quite unsatisfactory.

The crude tall oil material contains complex resin acids, many of which have not been specifically identified, fatty acids including principally oleic, linoleic and linolenic acids, other volatile constituents including unsaponifiable materials, and non-volatile matter of pitchy character.

An object of the present invention is to provide a process which will enable the recovery of resin acids and also fatty acids separately from each other and from other constituents of the tall oil, and also if possible to obtain the other constituents in some useful form.

This problem is complicated by the contaminating effect of the resinous constituents on the fatty acids and also by the tendency of certain constituents, when subjected to heat, to break down forming further color and odor bodies to the detriment of the product. It is possible to produce separation of the resin acids and fatty acids to some extent by using solvents such as acetone, alcohol, etc., but none of the methods heretofore used are effective to produce a sufficiently sharp separation of fatty acids and resin acids and at the same time free these acids from the other substances in tall oil which act as contaminants.

My improved process makes use of a series of zones containing liquid tall oil acids, these zones being vertically spaced and maintained under vacuum with the liquid acids contained in these zones having increasing proportions of fatty acids toward the top of the series and increasing proportions of resin acids toward the bottom of the series. Vaporized fatty acids are withdrawn from the top of the zones and a portion thereof returned in condensed form as reflux liquid, the remainder being retained as a fatty acid product. The resin acid fraction is withdrawn in liquid form from the bottom of the series of zones along with non-volatile material and is subjected to distillation to remove the resin acid product free from the pitch or non-volatile matter.

A further improved feature which may be used

2 in my process is the removal of low-boiling non-saponifiable matter from the tall oil prior to the separation of the fatty acids and resin acids above referred to. This pre-treatment step is accomplished by passing the tall oil into a series of zones which contain liquid tall oil acids and increasing proportions of the unsaponifiable matter toward the top of the series, the tall oil being removed at the bottom substantially free of the unsaponifiable substances. When low-boiling unsaponifiable substances are removed in the preliminary stage these substances are not subjected to the higher temperatures required for the separation of the long chain fatty acids from the complex resin acids and therefore are not subject to heat breakdown.

Though the pre-treatment fractionation step is highly efficient in removing the unsaponifiable substances in the matter which is subjected to process, I find that further substances of this nature are generated in the course of the process, probably through the effect of heat on certain unidentified constituents of the tall oil. It is yet a further feature of my invention to remove a liquid fatty acid product substantially free from such further unsaponifiable or non-acid substances at a point below the top of the series of zones functioning to separate fatty acids and resin acids. I prefer to recover the main body of fatty acids in this manner and to remove as product only a small fraction from the top of the series of zones. Though I find this feature highly advantageous in the tall oil process, its practice is not essential to the use of the process.

The accompanying drawing illustrates apparatus which may be used to practice the improved process, and using this apparatus the process may be conducted as follows:

Crude tall oil is fed through line 10 into a heat exchanger 11 in which the oil is heated and from which it is discharged through line 12 into a tower 13. This tower contains a series of vertically spaced trays or dividers 14 which provide spaced zones, one above the other, each of which carries liquid material. Vapors are withdrawn at the top of the tower through line 15, are condensed at 16 and a portion of the condensate, suitably 1 to 6% of the tall oil feed, is withdrawn through line 17 as the unsaponifiable product. The remainder, suitably amounting to 4 or 5 times the amount of the unsaponifiable product, is returned through line 18 to the top of the tower as reflux liquid. The withdrawal of vapors from the top serves to maintain the series of zones under reduced pressure. Steam is introduced into the lower portion of the tower through line 18, and the tall oil substantially free of unsaponifiable material is withdrawn through the bottom zone through line 20 and introduced at a median point into tower 21.

Tower 21 contains a number of trays or dividers 22 which provide a number of vertically spaced zones which contain liquid acids. Below these zones in the lower portion of tower 21 is a heater 23 employing heat exchanging fluid, and line 24 is provided for introducing steam into the bottom of this tower. Vaporous fatty acids including further unsaponifiable matter are withdrawn through the top of the tower through line 25, are condensed at 26, and a portion of the condensate is returned to the tower through line 27. Usually the amount returned as reflux is about 10 to 20 times the amount which is withdrawn through line 28 as overhead by-product. The main fatty acid product is withdrawn at point 36 which as shown on the drawing is four trays down from the top of the series and the product is delivered by line 37 to storage or to other processes. The rosin acid fraction is withdrawn from the bottom of the series of zones through line 29 leading from the bottom of the tower.

This rosin acid fraction is introduced into the flash chamber 30 in which the volatile material is converted to a vapor. This chamber is maintained under vacuum by means of the withdrawal of vapor through line 31. Lines 25 and 31 are each connected through their respective condensers 26 and 32 with a suitable means, not shown, for drawing a substantial vacuum. In this way the flash chamber is maintained at substantially the same low pressure as at the top of tower 21 (preferably between 3 and 5 mm. of mercury). The flash chamber is equipped with a coil 33 for adding heat, if desired, to the liquid material in this chamber. However, with the pressure in the flash chamber substantially lower than the lower portion of the tower 21 (due to the pressure differential between the top and bottom of the series of zones) the material passing into the flash chamber may contain sufficient heat without any being added to vaporous resin acids contained therein. Some heat may be desirable, however, for supplying the latent heat of vaporization or a part thereof. Whether or not heat be added at the flash chamber, the temperature within this chamber is preferably maintained below the temperature in the tower 21. The condensate from condenser 32 may be withdrawn through line 34 as the resin acid product and the pitch or non-volatile matter may be withdrawn through line 35 from the bottom of the flash chamber.

One set of specific operating conditions using the above procedure is as follows:

*Example*

Tall oil was fed to the heat exchanger 11 at the rate of 5000 lbs. per hour. Steam was introduced into tower 13 at a rate of 300 lbs. per hour. Vapor was withdrawn through line 15 at a rate of 800 lbs. per hour. Condensate was returned to tower 13 at a rate of 600 lbs. per hour and unsaponifiable product was withdrawn at the rate of 200 lbs. per hour. At the top of tower 13, pressure was 35 mm. and the temperature was 375° F.; and at the bottom of this tower the pressure was 65 mm. and the temperature was 475° F.

The top of tower 21 was maintained at a temperature of 375° F. and a pressure of 4 mm., vapors being withdrawn from this tower at a rate of 3000 lbs. per hour and condensate was returned at a rate of 2800 lbs. per hour, overhead unsaponifiable product being withdrawn at the rate of 200 lbs. per hour, the main fatty acid product being withdrawn from the fourth zone from the top of the tower at a rate of 1750 lbs. per hour. The bottom of tower 21 was at a pressure of 40 mm. and the liquid at this point had a temperature of 545° F. The resin acid was withdrawn from the bottom of tower 21 at a rate of 3050 lbs. per hour into the flash chamber 30 which was maintained at a pressure of 5 mm. and a temperature of 550° F., the vaporized acids being withdrawn at a rate of 1050 lbs. per hour.

Steam was introduced into tower 21 at the rate of 50 lbs. per hour and into the flash chamber 30 at the rate of 50 lbs. per hour.

The conditions given in the foregoing example may be taken as typical for one specific design of apparatus but may be varied between rather wide limits, and of course are to be governed by the size of the equipment, the specific number of zones employed, the specific content of the tall oil being processed, etc. While I have attempted to set forth the principles governing the practice of the improved process, I have not attempted to prescribe any specific conditions which will satisfy all circumstances of operation.

If desired, the use of tower 13 may be omitted and the crude tall oil introduced directly into tower 21. Such operation, however, is at the disadvantage of not being able to remove the unsaponifiable matter in the preliminary tower and therefore a less favorable color and odor is realized in the final products.

Steam is preferably introduced in substantial amounts into tower 13 and in small amounts into tower 31 and flash chamber 30. Desirably, the steam employed in tower 13 may be between .05 lb. and .1 lb. for each pound of crude tall oil feed stock. In tower 21 from .005 lb. to .05 lb. per pound of crude tall oil feed and in flash chamber 30 from .005 lb. to .05 lb. per pound of tall oil feed. It is possible to operate without the use of steam, and the operation is quite satisfactory without the use of any steam in tower 21 or flash chamber 30.

When in the foregoing explanation I refer to a series of zones vertically spaced, I do not necessarily mean all of the zones provided by the trays in any tower. In some installations only a part of the zones actually provided may be utilized in the separation function which we have explained, and it is possible for material to be withdrawn from the lowermost of a designated series of zones while yet being withdrawn from a middle point along the height of a tower.

It is desirable to have the series of zones which are contained in tower 21 of the illustrated apparatus at as low a pressure as can practically be maintained, preferably the vacuum at the top of this tower should be of the order of 5 mm. of mercury or less. This same low pressure may also be maintained in the flash chamber. If desired, the pressure within the flash chamber may be maintained even lower than the pressure at the top of tower 21. Though the process may be operated when such series of zones are at higher pressures than those above indicated, the operation will be at the expense of some chemical breakdown and somewhat less desirable results.

The resin acids and the pitch or non-volatile matter found in the bottom series of zones in tower 21 are highly complex materials which are difficult to handle in ordinary systems and readily decompose to form color and odor bodies which render the product undesirable. However, I have found that the separate treatment of these materials in the flash chamber 30 results in a highly desirable sharp separation of the resin acids from the pitch or non-volatile material.

Setting up a separate flash chamber for treatment of these materials renders it less difficult to maintain very low pressures in the chamber than if a fractionating tower were included within the chamber. Therefore, the pressure in flash chamber 30 is easily maintained at a point substantially below the pressure in the bottom of tower 21, and this makes it possible to carry out the desired process in the flash chamber at a temperature substantially below those used in the tower 21 and also in the tower 13. Thus, in the overall process, where the initial stripping and fractionating steps are carried out at higher temperatures, substantially all the thermal decomposition which might take place occurs during these prior steps. Use of a separate flash zone for vaporizing the resin acids enables lower pressures, which in turn permits lower temperatures, so that very little further thermal decomposition takes place during the flash distillation of the resin acids. I have found that, as a result, a particularly sharp separation between the resin acids and the pitch or non-volatile matter can be achieved, and the resin acids are produced substantially free of thermal decomposition contaminants.

This application is a continuation in part of my copending application Serial No. 670,089, filed May 16, 1946, which is a continuation with respect to common subject matter therein of my application Serial No. 577,247, filed February 10, 1945, and which has matured into Patent No. 2,450,612. Said application Serial No. 577,247 is in turn a division of my application (now abandoned) Serial No. 424,434, filed December 16, 1941, which in turn is a division of my application Serial No. 298,722, filed October 9, 1939, now matured into Patent No. 2,322,056.

The foregoing detailed description has been for explanation only, it being expected that the process may be practiced in widely varying forms using apparatus of greatly differing design, all within the spirit of the invention.

What I claim and desire to secure in Letters Patent is:

1. In a process for separating a mixture of tall oil fatty acids, rosin acids, volatile unsaponifiables, and pitch into its components wherein the mixture is subjected to fractional distillation in a fractionating column under reduced pressure and in the presence of steam, said column providing vertically-spaced zones each containing a pool of liquid, the method of obtaining a rosin acid fraction having a low content of volatile unsaponifiables and pitch characterized by the steps of introducing a mixture including tall oil fatty acids and rosin acids into an intermediate zone of said column, the zones in the upper portion of said column being maintained at lower pressures than the zones in the lower portion of said column, withdrawing a fatty acid fraction above said intermediate zone, withdrawing a liquid mixture including rosin acids and pitch below said intermediate zone, flashing the withdrawn rosin acids and pitch mixture into a flash zone maintained at a substantially lower pressure than said column at the point of withdrawal of said rosin and pitch mixture, thereby at least partially vaporizing the rosin acids in said rosin acid and pitch mixture, subjecting the unvaporized portion of said rosin acid and pitch mixture to the stripping action of steam to vaporize additional quantities of rosin acids, and withdrawing a vaporized rosin acid fraction from said flash zone having a low content of volatile unsaponifiables and pitch.

2. In a process for separating a mixture of tall oil fatty acids, rosin acids, volatile unsaponifiables, and pitch into its components wherein the mixture is subjected to fractional distillation in a fractionating column under reduced pressure and in the presence of steam, said column providing vertically-spaced zones each containing a pool of liquid, the method of obtaining a rosin acid fraction having a low content of volatile unsaponifiables and pitch characterized by the steps of introducing a mixture of tall oil fatty acids, rosin acids, volatile unsaponifiables and pitch into an intermediate zone of said column, the top of said column being maintained at a substantially lower pressure than the bottom of said column, withdrawing a fatty acid fraction above said intermediate zone, withdrawing a liquid mixture including substantially all of the rosin acids and pitch introduced into said column from the bottom of said column, flashing the withdrawn rosin and pitch mixture into a flash zone maintained at a substantially lower pressure than the bottom of said column to at least partially vaporize the rosin acids while minimizing the formation of volatile unsaponifiables, steam stripping the unvaporized portion of said rosin acids and pitch mixture to vaporize additional rosin acids while minimizing the formation of volatile unsaponifiables, withdrawing liquid pitch from said flash zone of low rosin acid content, and withdrawing a vaporized rosin acid fraction from said flash zone having a low content of volatile unsaponifiables and pitch.

3. In a process for separating a mixture of tall oil fatty acids, rosin acids, volatile unsaponifiables, and pitch into its components wherein the mixture is subjected to fractional distillation in a fractionating column under reduced pressure and in the presence of steam, said column providing vertically-spaced zones each containing a pool of liquid, the method of obtaining a fatty acid fraction of low rosin acid and low volatile unsaponifiable content and at the same time obtaining a rosin acid fraction having a low content of volatile unsaponifiables and pitch characterized by the steps of introducing a mixture of tall oil fatty acids, rosin acids, volatile unsaponifiables and pitch into an intermediately-positioned feed zone of said column having a plurality of said zones both above and below said feed zone, thereby providing an upper column section and a lower column section separated by said feed zone and each containing a plurality of said zones, withdrawing a liquid fatty acid fraction of low rosin acid and low unsaponifiable content from a zone in the top portion of said upper section beneath the uppermost zone in said upper section, withdrawing a fraction relatively rich in unsaponifiables from a zone in said upper section above the zone from which said fatty acid fraction is withdrawn, withdrawing a liquid mixture including rosin acids and pitch below said intermediate zone, flashing the withdrawn rosin acids and pitch mixture into a flash zone maintained at a substantially lower pressure than said column at the point of withdrawal of said rosin and pitch mixture, thereby at least partially vaporizing the rosin acids in said rosin acid and pitch mixture, subjecting the unvaporized portion of said rosin acid and pitch mixture to the stripping action of steam to vaporize additional quantities of rosin acids, and withdrawing a vaporized rosin acid fraction from said flash zone having a low content of volatile unsaponifiables and pitch.

4. In a process for separating a mixture of tall oil fatty acids, rosin acids, volatile unsaponifiables, and pitch into its components wherein the mixture is subjected to fractional distillation in a fractionating column under reduced pressure and in the presence of steam, said column providing vertically-spaced zones each containing a pool of liquid, the method of obtaining a fatty acid fraction of low rosin acid and low volatile unsaponifiable content and at the same time obtaining a rosin acid fraction having a low content of volatile unsaponifiables and pitch characterized by the steps of introducing a mixture of tall oil fatty acids, rosin acids, volatile unsaponifiables and pitch into an intermediate zone of said column having a plurality of said zones both above and below said intermediate zone, withdrawing the main body of the fatty acids in said mixture as a liquid fatty acid fraction of low rosin acid and low unsaponifiable content from a zone beneath the uppermost zone in said column but nearer said uppermost zone than said intermediate zone, withdrawing a lesser amount of the fatty acids in said mixture as a fraction relatively rich in unsaponifiables from a zone above the zone from which the main body of said fatty acids is withdrawn, withdrawing a liquid mixture including substantially all of the rosin acids and pitch introduced into said column from the bottom of said column, flashing the withdrawn rosin and pitch mixture into a flash zone maintained at a substantially lower pressure than the bottom of said column to at least partially vaporize the rosin acids while minimizing the formation of volatile unsaponifiables, steam stripping the unvaporized portion of said rosin acids and pitch mixture to vaporize additional rosin acids while minimizing the formation of volatile unsaponifiables, withdrawing liquid pitch from said flash zone of low rosin acid content, and withdrawing a vaporized rosin acid fraction from said flash zone having a low content of volatile unsaponifiables and pitch.

References Cited in the file of this patent

UNITED STATES PATENTS

| Number | Name | Date |
|---|---|---|
| 1,826,331 | Schultze | Oct. 6, 1931 |
| 2,224,984 | Potts et al. | Dec. 17, 1940 |
| 2,224,986 | Potts et al. | Dec. 17, 1940 |
| 2,278,583 | French | Apr. 7, 1942 |
| 2,361,441 | Murphy | Oct. 31, 1944 |

FOREIGN PATENTS

| Number | Country | Date |
|---|---|---|
| 106,325 | Sweden | Jan. 19, 1943 |

OTHER REFERENCES

Robinson, "Elements of Fractional Distillation," First Edition, published 1922 by McGraw-Hill, New York, New York, pages 61, 62, 91, 114, and 115.